(12) United States Patent
Furuya et al.

(10) Patent No.: US 12,304,467 B2
(45) Date of Patent: May 20, 2025

(54) DRIVING ASSIST DEVICE

(71) Applicant: SUBARU CORPORATION, Tokyo (JP)

(72) Inventors: Takahiro Furuya, Tokyo (JP); Hideki Sugawara, Tokyo (JP); Anfen Ye, Tokyo (JP); Kazuki Yamaguchi, Tokyo (JP); Wataru Matsudate, Tokyo (JP); Hayato Hori, Tokyo (JP); Takayuki Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 253 days.

(21) Appl. No.: 18/148,142

(22) Filed: Dec. 29, 2022

(65) Prior Publication Data

US 2023/0227028 A1    Jul. 20, 2023

(30) Foreign Application Priority Data

Jan. 20, 2022    (JP) .................................. 2022-007429

(51) Int. Cl.
*B60W 30/09*    (2012.01)
*B60W 10/18*    (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC .. B60W 30/09; B60W 10/18; B60W 30/0956; B60W 30/18159; B60W 30/182;
(Continued)

(56) References Cited

U.S. PATENT DOCUMENTS

2019/0243371 A1*  8/2019  Nister .................. G05D 1/0255
2020/0001875 A1*  1/2020  Kato .................. G01C 21/3602
(Continued)

FOREIGN PATENT DOCUMENTS

JP    2017-224055 A    12/2017

OTHER PUBLICATIONS

T. Zhang, W. J. Song, M. Y. Fu, Y. Yang, and M. L. Wang, "Vehicle Motion Prediction at Intersections Based on the Turning Intention and Prior Trajectories Model," IEEE/CAA J. Autom. Sinica, vol. 8, No. 10, pp. 1657-1666, Oct. 2021. (Year: 2021).*

*Primary Examiner* — Adam R Mott
*Assistant Examiner* — Matthew C Gammon
(74) *Attorney, Agent, or Firm* — Rimon P.C.

(57) ABSTRACT

A driving assist device includes a driving assist controller. The driving assist controller includes an oncoming vehicle detection unit, a prediction determination unit, a predicted travel region setting unit and a stop controller. The oncoming vehicle detection unit is configured to, when a vehicle enters an intersection, determine whether an oncoming vehicle going to enter the intersection is present. The prediction determination unit is configured to, when the oncoming vehicle detection unit determines that the oncoming vehicle is going to enter the intersection, determine whether a course of the oncoming vehicle is predictable based on vehicle behavior of the oncoming vehicle. The predicted travel region setting unit is configured to set a predicted travel region of the oncoming vehicle based on the vehicle behavior. The stopping controller is configured to cause the vehicle to stop outside of the predicted travel region set by the predicted travel region setting unit.

10 Claims, 7 Drawing Sheets

(51) Int. Cl.
*B60W 30/095* (2012.01)
*B60W 30/18* (2012.01)
*B60W 30/182* (2020.01)
*B60W 50/00* (2006.01)

(52) U.S. Cl.
CPC .... *B60W 30/18159* (2020.02); *B60W 30/182* (2013.01); *B60W 50/0097* (2013.01); *B60W 2540/12* (2013.01); *B60W 2554/4045* (2020.02); *B60W 2554/4046* (2020.02); *B60W 2710/18* (2013.01)

(58) Field of Classification Search
CPC ......... B60W 50/0097; B60W 2540/12; B60W 2554/4045; B60W 2554/4046; B60W 2710/18
See application file for complete search history.

(56) References Cited

U.S. PATENT DOCUMENTS

| | | | |
|---|---|---|---|
| 2021/0042542 A1* | 2/2021 | Littman | G06V 20/41 |
| 2021/0295683 A1* | 9/2021 | Tsai | G08G 1/0145 |
| 2022/0032957 A1* | 2/2022 | Wulfe | G01C 21/3407 |
| 2023/0286478 A1* | 9/2023 | Inami | B60T 7/22 |

\* cited by examiner

DRIVING ASSIST DEVICE

CROSS-REFERENCE TO RELATED APPLICATIONS

The present application claims priority from Japanese Patent Application No. 2022-007429 filed on Jan. 20, 2022, the entire contents of which are hereby incorporated by reference.

BACKGROUND

The present disclosure relates to a driving assist device that sets a predicted travel region and stops a vehicle outside of the predicted travel region in a case where the vehicle, after entering an intersection via driving assist control, goes to change course to a direction crossing an oncoming lane but cannot predict a travel path of an oncoming vehicle.

With a known driving assist device, in a case where a vehicle goes to change course to a direction (right-turn direction on a road in a left-hand traffic jurisdiction) crossing an oncoming lane after entering an intersection, a vehicle (oncoming vehicle) traveling in the oncoming lane is recognized and the possibility of contact between the vehicle and the oncoming vehicle is determined. In a case where the possibility is high, this is reported to the driver. In a case where no imminent contact is determined, the course change is continued. Such a technique is described in Japanese Unexamined Patent Application Publication (JP-A) 2017-224055 and the like.

At this time, in a case where it becomes clear that the oncoming vehicle having entered the intersection will change course to a direction crossing the lane where the vehicle is traveling, the vehicle is able to change course to a direction crossing the oncoming lane. This is because there is no possibility of the vehicle and the oncoming vehicle coming into contact even if the oncoming vehicle has entered the intersection. Accordingly, for example, in a case where the oncoming vehicle is traveling in a straight ahead/right turn only lane or a right turn only lane on a road in a left-hand traffic jurisdiction and a right blinker is on, the vehicle can turn right without waiting for the oncoming vehicle to enter the intersection and pass.

SUMMARY

An aspect of the disclosure provides a driving assist device. The driving assist device includes a traveling environment information acquisition unit, an oncoming vehicle information acquisition unit, and a driving assist controller. The travel environment information acquisition unit is configured to acquire traveling environment information about a traveling environment ahead of a vehicle. The oncoming vehicle information acquisition unit is configured to acquire information about an oncoming vehicle traveling in an oncoming lane. The driving assist controller has, as driving modes for the vehicle, a manual driving mode where a driver who drives the vehicle operates the vehicle and a driving assist mode, and is configured to, in the driving assist mode, perform driving assistance when the vehicle changes a course by crossing the oncoming lane at an intersection. The driving assist controller includes an oncoming vehicle detection unit, a prediction determination unit, a predicted travel region setting unit, and a stopping controller. The oncoming vehicle detection unit is configured to, when the vehicle enters the intersection, determine whether the oncoming vehicle entering the intersection is present based on the information about the oncoming vehicle acquired by the oncoming vehicle information acquisition unit. The prediction determination unit is configured to, when the oncoming vehicle detection unit determines that the oncoming vehicle is going to enter the intersection, determine whether a course of the oncoming vehicle is predictable based on vehicle behavior of the oncoming vehicle. The predicted travel region setting unit is configured to, when the prediction determination unit determines that the course of the oncoming vehicle is not predictable, set a predicted travel region of the oncoming vehicle based on the vehicle behavior. The stopping controller is configured to cause the vehicle to stop outside of the predicted travel region set by the predicted travel region setting unit.

An aspect of the disclosure provides a driving assist device. The driving assist device includes circuitry. The circuitry is configured to acquire traveling environment information about a traveling environment ahead of a vehicle. The circuitry is configured to acquire information about an oncoming vehicle traveling in an oncoming lane. The circuitry is configured to have, as driving modes for the vehicle, a manual driving mode where a driver who drives the vehicle operates the vehicle and a driving assist mode, and, in the driving assist mode, perform driving assistance when the vehicle changes course by crossing an oncoming lane at an intersection. The circuitry is configured to, when the vehicle enters the intersection, determine whether an oncoming vehicle going to enter the intersection is present based on the acquired information about the oncoming vehicle. The circuitry is configured to, upon determining that the oncoming vehicle is going to enter the intersection, determine whether a course of the oncoming vehicle is predictable based on vehicle behavior of the oncoming vehicle . The circuitry is configured to, upon determining that the course of the oncoming vehicle is unpredictable, set a predicted travel region of the oncoming vehicle based on the vehicle behavior. The circuitry is configured to cause the vehicle to stop outside of the predicted travel region.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In some cases, the travel path of an oncoming vehicle may not be predicted from the vehicle behavior. For example, in a case where, in the state where the oncoming vehicle approaches with the blinker on the side that crosses the lane where the vehicle is traveling or in the state where the oncoming vehicle is traveling in a right turn only lane on a road in a left-hand traffic jurisdiction, the oncoming vehicle yet travels straight ahead through the intersection, a vehicle M is brought to an emergency stop by a driving assist device activating Autonomous Emergency Braking (AEB), flustering the driver and the occupant.

It is desirable to provide a driving assist device that can avoid contact between a vehicle and an oncoming vehicle without flustering a driver and an occupant, even in a case where a travel path of the oncoming vehicle entering an intersection cannot be predicted.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the present embodiment is described assuming left-hand traffic. Thus, left and right is intended be interchanged when applying the present embodiment to a right-hand traffic jurisdiction.

Figure 1:
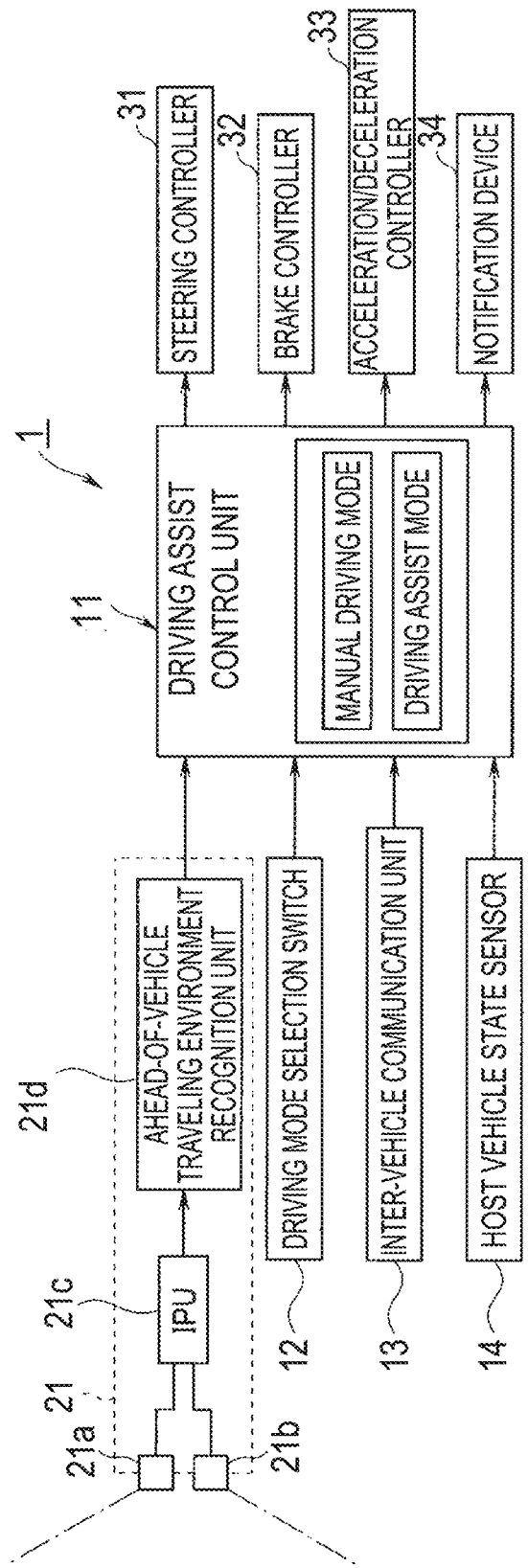
FIG. 1 is a schematic configuration diagram of a driving assist device.

A driving assist device 1 illustrated in FIG. 1 is installed in a vehicle M (see FIGS. 3 to 6). The driving assist device 1 includes a driving assist control unit 11 as a driving assist controller and a camera unit 21. The driving assist control unit 11 and an ahead-of-vehicle traveling environment recognition unit 21d described below are constituted by microcontrollers including a CPU, RAM, ROM, rewritable non-volatile memory (flash memory or EEPROM), and peripheral units. The ROM stores programs, fixed data, and the like necessary for the CPU to execute various processing. The RAM is provided as a working area of the CPU and temporarily stores various types of data in the CPU. Note that the CPU is also referred to as a microprocessor (MPU) or a processor.

Also, a graphics processing unit (GPU) or a graph streaming processor (GSP) may be used instead of the CPU. Alternatively, a CPU, a GPU, and a GSP may be selectively used in combination.

The camera unit 21 is fixed to a central upper portion of a front area in a cabin of the vehicle M. The camera unit 21 includes an onboard camera (stereo camera) including a main camera 21a and a sub-camera 21b, an image processing unit (IPU) 21c, and the ahead-of-vehicle traveling environment recognition unit 21d. The cameras 21a and 21b are disposed at left-right symmetrical positions on either side of the center in the vehicle width direction with a predetermined baseline length. The cameras 21a and 21b are both wide-angle cameras that can capture a wide range to the left and right in the vehicle width direction immediately ahead of the vehicle M, as indicated by the dot-dash lines in FIG. 1.

The camera unit 21 executes predetermined image processing via the IPU 21c on traveling environment image information captured for a predetermined imaging region If (see FIGS. 3 to 6) ahead of the vehicle M by the cameras 21a and 21b. The ahead-of-vehicle traveling environment recognition unit 21d reads the traveling environment image information after image processing by the IPU 21c, and recognizes and acquires ahead-of-vehicle traveling environment information on the basis of the traveling environment image information. Examples of the acquired ahead-of-vehicle traveling environment information include the shape of the road where the vehicle M travels (road curvature (1/m) at the center of the lane marking defining the left and right, width (vehicle width) between the left/right lane markings), stationary targets including intersections, road signs, and pedestrian crossings, moving targets (e.g., pedestrians and bicycles), preceding vehicles traveling ahead, and oncoming vehicles traveling in the oncoming lane. Note that the camera unit 21 may be a monocular camera including only the main camera 21a. Further, instead of the sub-camera 21b, an ultrasonic wave sensor, a millimeter wave radar, a microwave radar, an infrared sensor, a laser radar, light detection and ranging (LiDAR), or a combination of two or more thereof may be used to search in a wide area ahead of the vehicle M and recognize the ahead-of-vehicle traveling environment information via the ahead-of-vehicle traveling environment recognition unit 21d.

Also, the driving assist control unit 11 is coupled, at an input side, the ahead-of-vehicle traveling environment recognition unit 21d of the camera unit 21, a driving mode selection switch 12 for the driver to select a driving mode, an inter-vehicle communication unit 13, and a vehicle state sensor 14. The driving modes able to be selected via the driving mode selection switch 12 are a manual driving mode and a driving assist mode.

In the driving assist mode, at least a part of the driving operations of the driver is performed by the driving assist control unit 11 instead of the driver. Examples of driving assist modes include Adaptive Cruise Control (ACC), Active Lane Keep Bouncing (ALKB) control, turning right driving assist control when the vehicle M enters an intersection and turns right, and similar semi-automatic driving. Of these controls, in the present embodiment, at least the turning right driving assist control is performed. Note that the driving assist mode may be a fully automated driving that replaces all of the driving operations of the driver.

In this case, in a case where the driver operates the driving mode selection switch 12 and selects the manual driving mode, the driving assist control unit 11 cancels driving assistance. As a result, the vehicle M travels in accordance with the driver's accelerator pedal operation, steering wheel operation, and brake operation.

Also, the inter-vehicle communication unit 13 performs communication with other vehicles, such as a preceding vehicle or an oncoming vehicle, and acquires information relating to the operating state of the other vehicles. In one embodiment, the inter-vehicle communication unit 13 as well as the ahead-of-vehicle traveling environment recognition unit 21d of the camera unit 21 described above may serve as an "oncoming vehicle information acquisition unit".

The vehicle state sensor 14 is a generic name for a sensor group that detects various states relating to the vehicle M. Examples of the vehicle state sensor 14 include a vehicle speed sensor that detects the vehicle speed (speed of vehicle) of the vehicle M, a steering angle sensor that detects the steering angle of the vehicle M, a yaw rate sensor that detects the yaw rate that acts on the vehicle body, an accelerator pedal position sensor that detects the amount by which the accelerator pedal is depressed, and a signal or the like from a brake switch that turns on when the brake pedal is depressed or a blinker switch that turns the left and right blinkers on/off.

The driving assist control unit 11 is coupled to, at an output side, a steering controller 31 that assists the steering wheel operation of the driver by driving electric power steering (EPS), a brake controller 32 that decelerates the vehicle M via forced braking, an acceleration/deceleration controller 33 that controls the output of a driving source (engine, electric motor, or the like) installed in the vehicle M, and a notification device 34 that notifies the driver of necessary information via audio or images.

The driving assist control unit 11, from the ahead-of-vehicle traveling environment information recognized via the ahead-of-vehicle traveling environment recognition unit 21d of the camera unit 21, recognizes road signs standing on the road shoulder and the intersections ahead of the vehicle and recognizes road markings indicating the traffic direction designations marked in the traveling lanes and oncoming lanes before an intersection (see FIGS. 3 to 6).

In a case where the driving assist control unit 11 detects an intersection ahead of the vehicle M while the vehicle M is traveling in driving assist mode, the driving assist control unit 11 checks whether the vehicle M is going to turn right. Then, in a case where the driving assist control unit 11 determines that the vehicle M is going to turn right, an oncoming vehicle F traveling in the oncoming lane is recognized.

Next, the driving assist control unit 11 checks whether there is a possibility of contact between the vehicle M and the recognized oncoming vehicle F. In a case where the driving assist control unit 11 determines that no contact is imminent between the oncoming vehicle F and the vehicle M, travel in the right-turn direction is continued. In a case where the driving assist control unit 11 determines that there is a high possibility of contact between the vehicle M and the oncoming vehicle F, forced braking is activated and the vehicle M is stopped. Thereafter, the driving mode is changed to manual driving mode, and driving of the vehicle M is taken over by the driver.

Figure 2A:
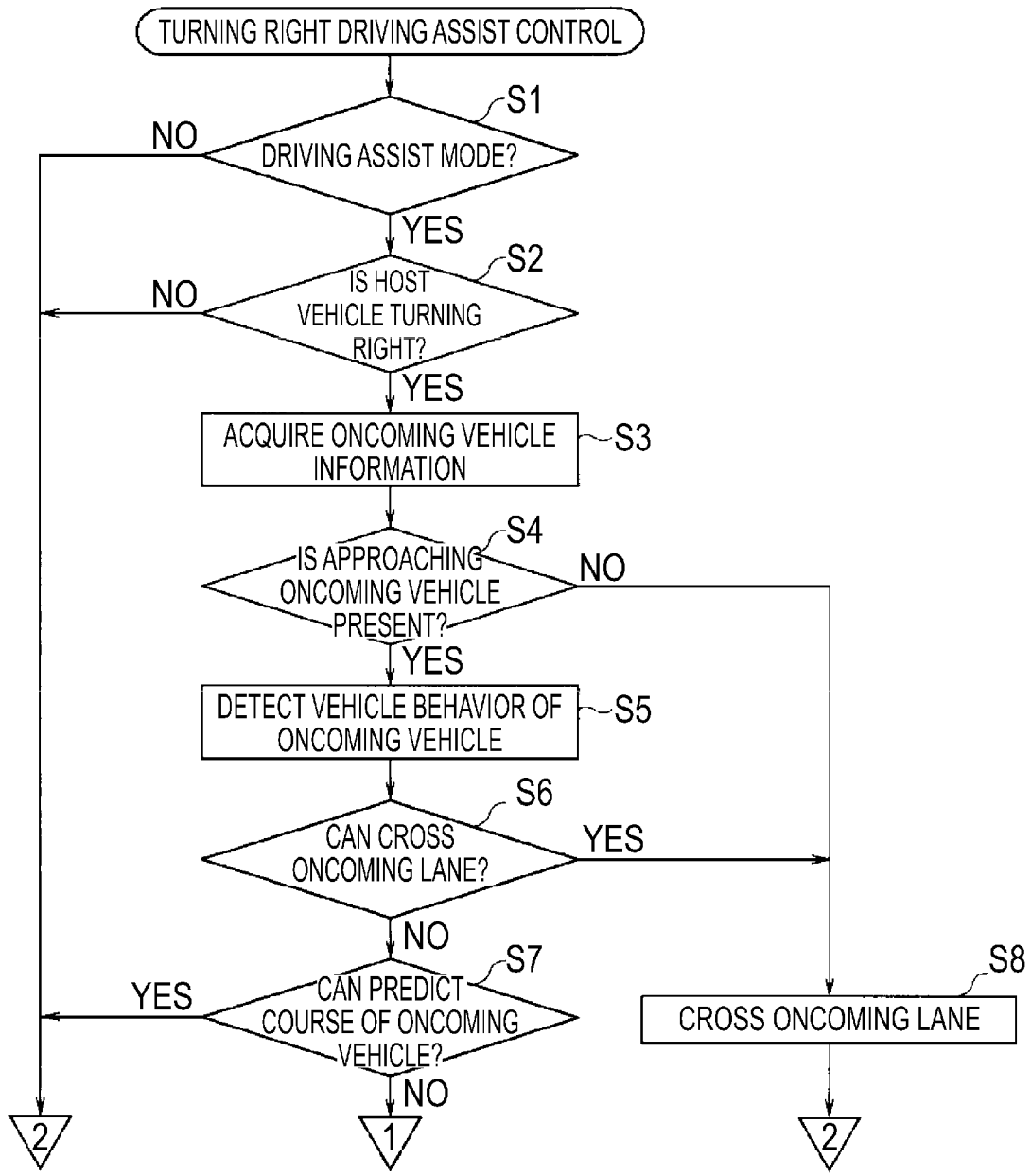
FIG. 2A is a flowchart (part 1) illustrating a turning right driving assist control routine.
Figure 2B:
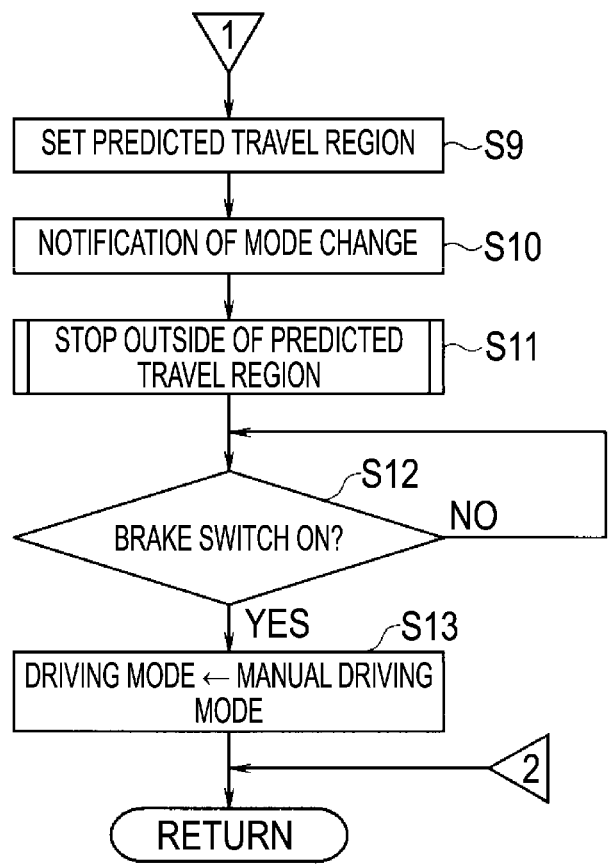
FIG. 2B is a flowchart (part 2) illustrating the turning right driving assist control routine.

In one example, the above-described driving assistance performed by the driving assist control unit 11 before entering an intersection is performed in accordance with a pre-intersection-entry driving assist control routine illustrated in FIGS. 2A and 2B.

This routine starts in a case where it is determined that the vehicle M has entered an intersection in the main routine. Note that entry to the intersection is determined on the basis of the ahead-of-vehicle traveling environment information recognized by the ahead-of-vehicle traveling environment recognition unit 21d of the camera unit 21. Also, in a case where the vehicle M is installed with a car navigation system, this determination may be performed on the basis of road map information of the car navigation system. Note that the ahead-of-vehicle traveling environment recognition unit 21d and the road map information correspond to a traveling environment information acquisition unit of the present disclosure.

Then, in the main routine, when it is determined that the vehicle M has entered the intersection and the routine has activated, first in step S1, the current driving mode is checked. The driving mode is set to either the manual driving mode or the driving assist mode by the driver operating the driving mode selection switch. In step S1, in a case where it is determined that the mode is set to the driving assist mode, the processing proceeds to step S2. In a case where it is determined that the mode is set to the manual driving mode, the routine ends. As described above, in a case where the driving assist mode is selected as the driving mode, semi-automated driving or fully automated driving including ACC control, ALKB control, and turning right driving assist control is performed.

Then, in step S2, it is determined whether the vehicle M is going to turn right by the driver operating the vehicle M from the vehicle behavior (information including lighting of a right blinker, steering wheel operation, vehicle speed, traffic designation of the lane where the vehicle M is traveling, and the like) of the vehicle M while in semi-automated driving. Alternatively, while in fully automated driving, it is determined whether the driving assist control unit 11 intends to make the vehicle M turn right in accordance with a preset target travel path.

In step S2, in a case where it is determined that the vehicle M is going to turn right, the processing proceeds to step S3. In a case where the vehicle M is heading straight ahead or going to turn left, the routine ends. In step S3, oncoming vehicle information is acquired that indicates whether the oncoming vehicle F approaching the intersection is present. The oncoming vehicle information is acquired from the ahead-of-vehicle traveling environment information recognized by the ahead-of-vehicle traveling environment recognition unit 21d of the camera unit 21 and the travel information of the oncoming vehicle F received by the inter-vehicle communication unit 13.

Subsequently, the processing proceeds to step S4, and whether an oncoming vehicle approaching in the oncoming lane within a range distanced from the intersection by a predetermined distance (for example, from 30 to 50 m) is present is checked on the basis of the oncoming vehicle information. Then, in a case where the approaching oncoming vehicle F is detected, the processing proceeds to step S5. In a case where the oncoming vehicle F is not detected, the processing branches to step S8. Note that the processing of step S4 is handled by an oncoming vehicle detection unit of the present disclosure.

Also, in step S5, the vehicle behavior of the oncoming vehicle F is detected. The vehicle behavior of the oncoming vehicle F includes the amount of change over time in the position of the oncoming vehicle F, and whether the blinker is on. The vehicle behavior is detected on the basis of the front traveling environment information recognized by the ahead-of-vehicle traveling environment recognition unit 21d of the camera unit 21 and the travel information of the oncoming vehicle F received by the inter-vehicle communication unit 13. The travel trajectory of the oncoming vehicle F can be obtained by performing approximation using interpolation polynomial or using a method of least squares, to the amount of change over time in the position of the oncoming vehicle F detected via the vehicle behavior.

Then, in step S6, the arrival time at the vehicle M is predicted from the vehicle behavior of the oncoming vehicle F, and whether the vehicle M can cross the oncoming lane without coming into contact with the oncoming vehicle F is checked. This is determined by obtaining a point where the vehicles F and M meet from vehicle behavior of the oncoming vehicle F and the course of the vehicle M and obtaining the arrival time of the vehicles F and M at the point, for example.

In a case where it is determined that the vehicle M cannot cross the oncoming lane, the processing proceeds to step S7. In a case where it is determined that the vehicle M can cross the oncoming lane, the processing branches to step S8.

In a case where the processing proceeds from step S4 or step S6 to step S8, the course change to the direction (right-turn direction) crossing the oncoming lane of the vehicle M is continued, and the routine ends.

On the other hand, in a case where the processing proceeds to step S7, whether the course of the oncoming vehicle F is predictable from the vehicle behavior of the oncoming vehicle F is checked. Note that the processing of steps S5 to S7 is handled by a prediction determination unit of the present disclosure.

Figure 3:
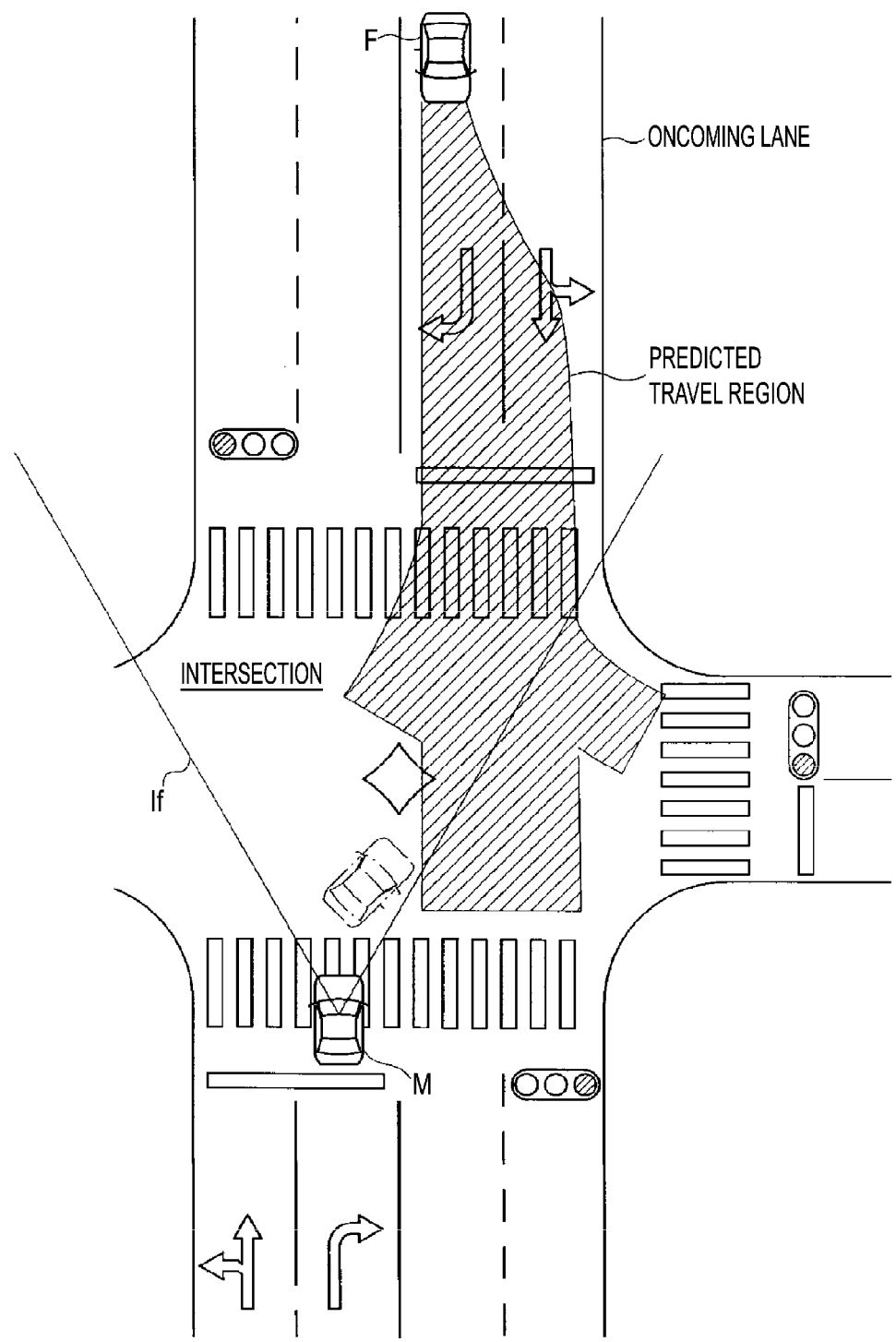
FIG. 3 illustrates a predicted travel region of an oncoming vehicle traveling in an oncoming lane when a vehicle is going to turn right.

For example, as illustrated in FIG. 3, the oncoming vehicle F at a position relatively far from the intersection is traveling in the right turn only lane and is going to enter the intersection, but has not yet turned on the right blinker. Thus, the course of the oncoming vehicle F cannot be predicted.

Figure 5:
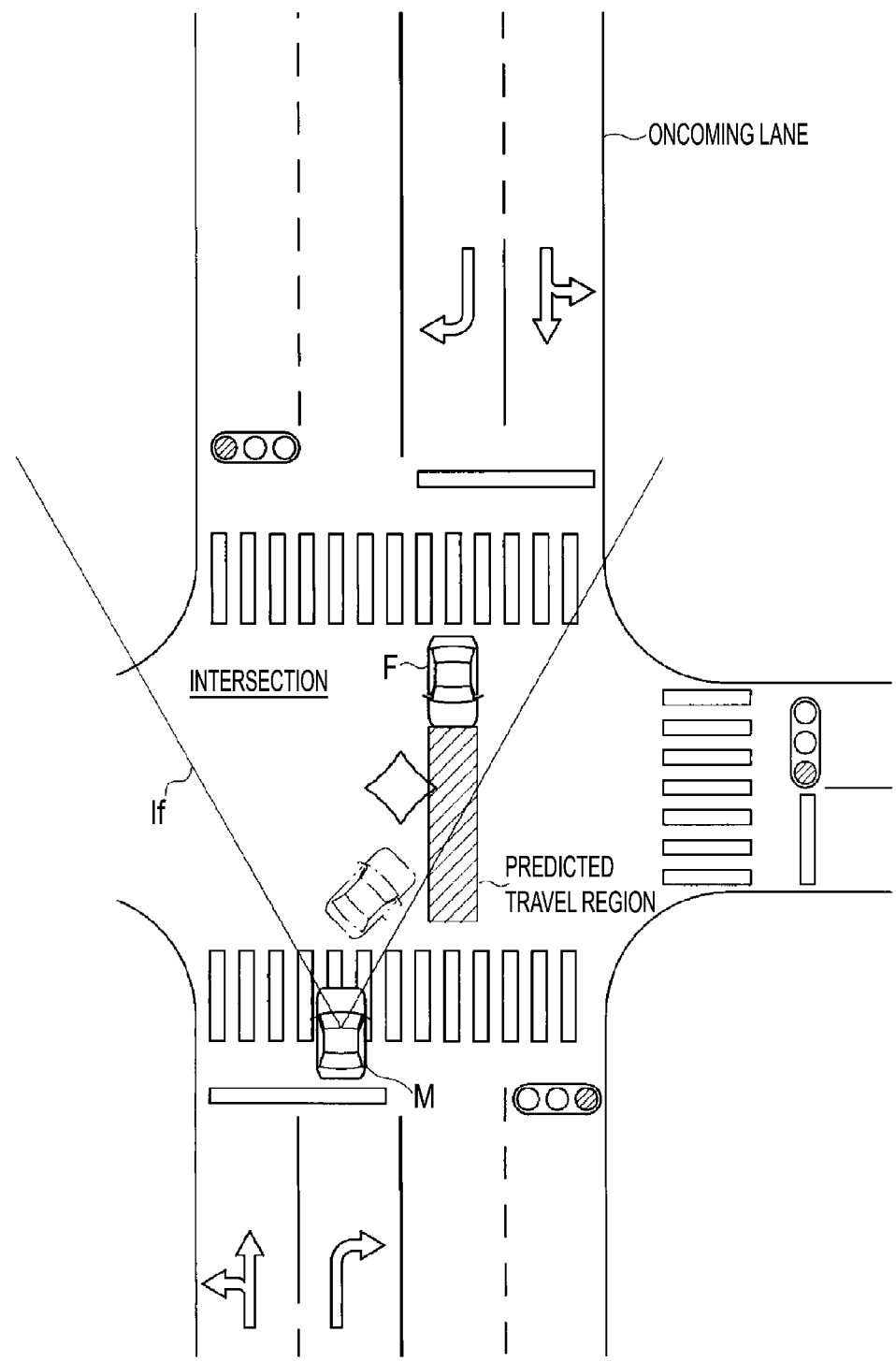
FIG. 5 illustrates a predicted travel region of an oncoming vehicle going to travel straight ahead after entering a set intersection when the vehicle is going to turn right.
Figure 6:
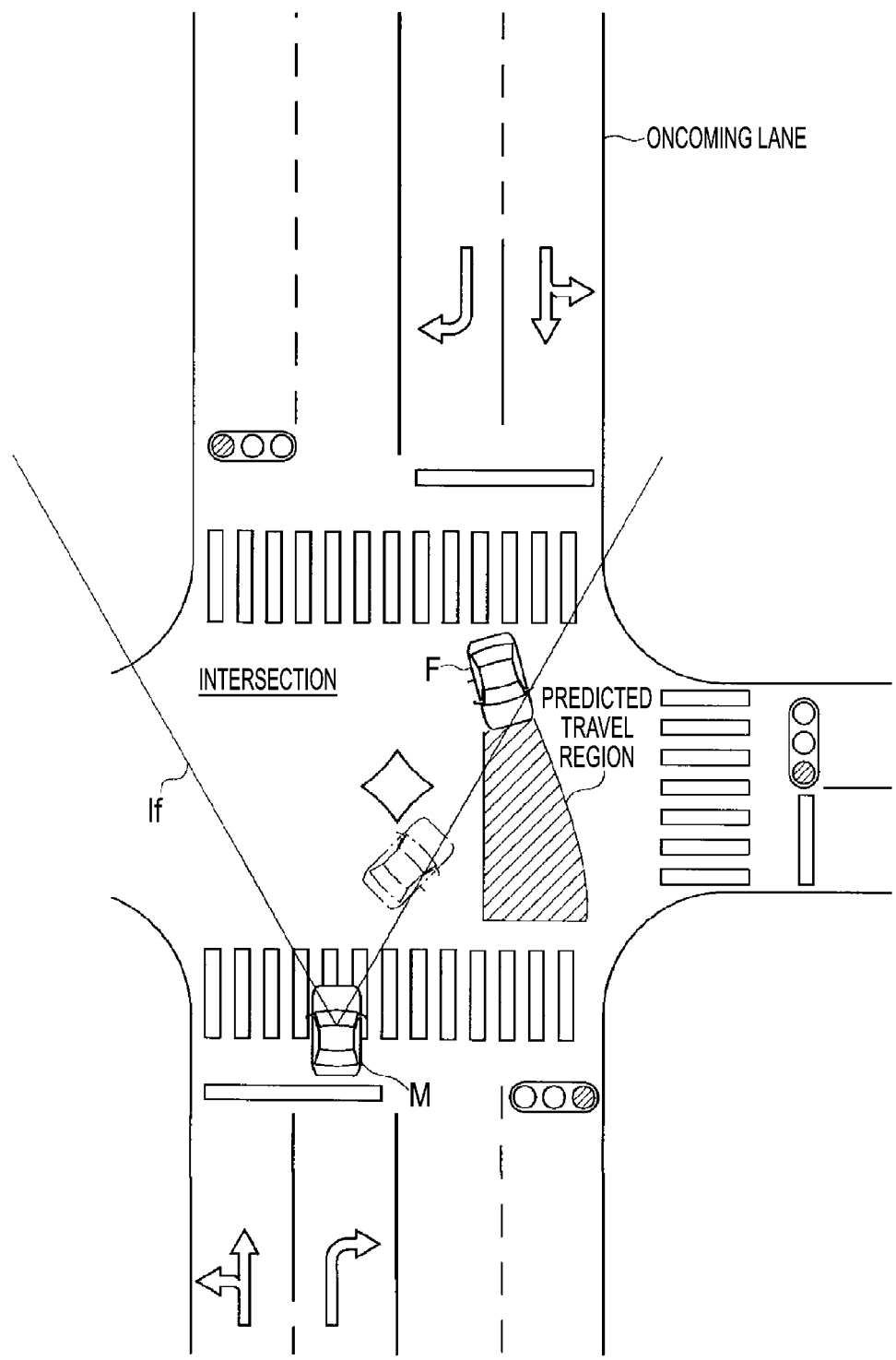
FIG. 6 illustrates a predicted travel region of an oncoming vehicle going to change course after entering a set intersection when the vehicle is going to turn right.

In such a case, as illustrated in FIG. 5, there is the possibility of the oncoming vehicle F traveling straight ahead through the intersection from the right turn only lane. Alternatively, as illustrated in FIG. 6, the possibility of the oncoming vehicle F changing course to the adjacent lane in the intersection is also plausible. In a case such as this where the driving assist control unit 11 cannot predict the course of the oncoming vehicle F, the driving of the vehicle M is to be taken over by the driver.

Figure 4:
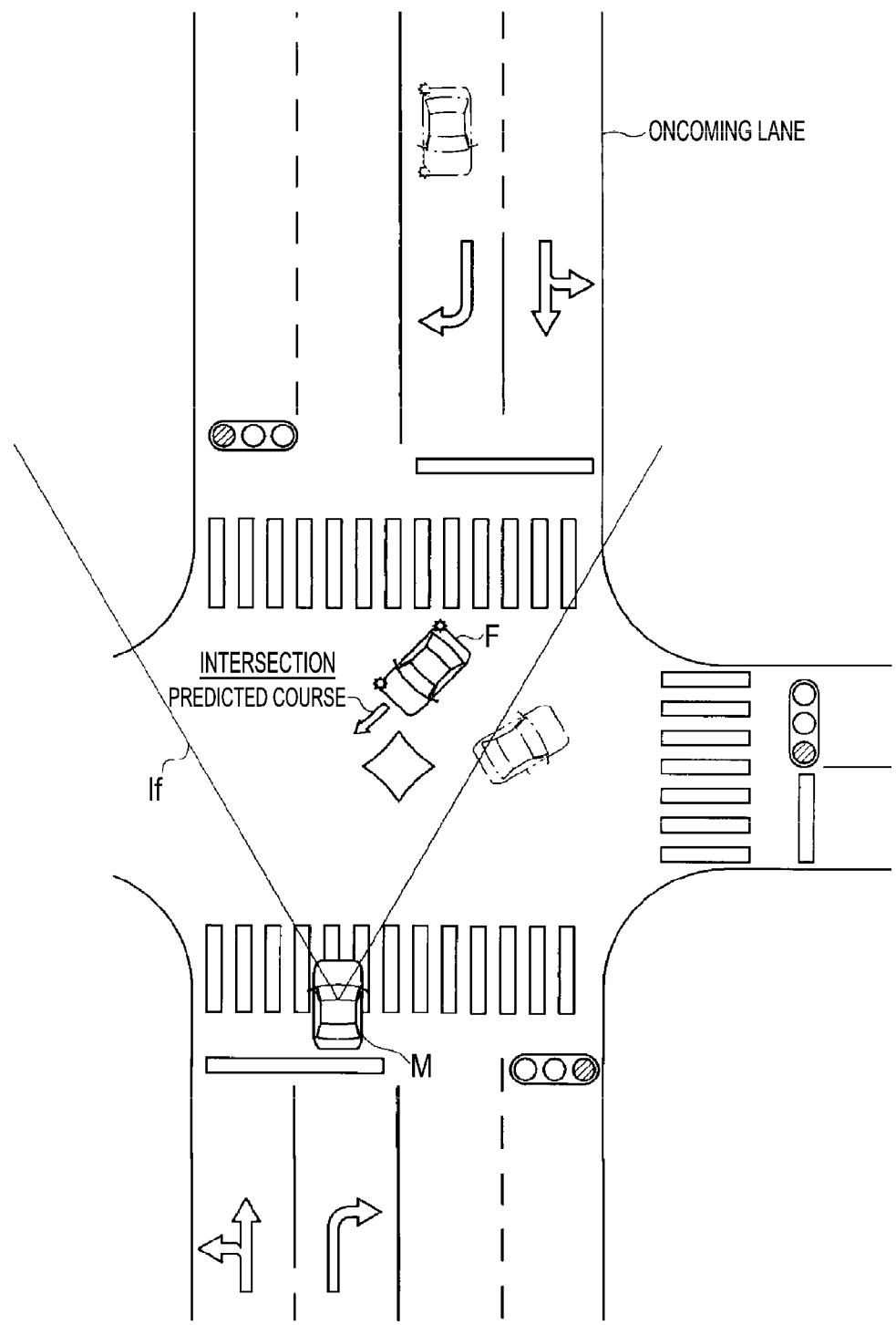
FIG. 4 illustrates a predicted travel region of an oncoming vehicle going to turn right after entering a set intersection when the vehicle is going to turn right.

On the other hand, as indicated by the dot-dash line in FIG. 4, in a case where the oncoming vehicle F is traveling in the right turn only lane with its right blinker on and goes to change course to the right-turn direction at the intersection, the driving assist control unit 11 can determine that the oncoming vehicle F is clearly turning right, and thus the course can be predicted.

Then, in a case where the course of the oncoming vehicle can be predicted, the routine ends from step S7, and the driving assist control of the vehicle M is continued corresponding to the course (predicted course) predicted for the oncoming vehicle F. Note that in a case where the travel path of the vehicle M crosses the travel path of the oncoming vehicle F, for example, a stopping target vehicle speed V for automatically stopping the vehicle M at a stopping target position set before the oncoming vehicle F passes the vehicle M is obtained for every calculation cycle from Equation (1) below, which is a typical relationship formula between speed and position.

$$2ax = V^2 - V0^2 \quad (1)$$

Here, a is the required deceleration (negative acceleration), x is the distance to the stopping target position, V0 is the current vehicle speed, V is the stopping target vehicle speed (target vehicle speed to make V0 0 (Km/h)).

Then, the driving assist control unit 11 controls the brake controller 32 and the acceleration/deceleration controller 33 on the basis of the stopping target vehicle speed V, and causes the vehicle M to automatically stop at the stopping target position.

On the other hand, in a case where it is determined that the course of the oncoming vehicle F cannot be predicted and the processing proceeds to step S9, in steps S9 to S12, the driving assist control unit 11 changes the driving mode to the manual driving mode and executes the processing for the driver to take over the driving of the vehicle M.

First, in step S9, a travel region (predicted travel region) that is predictable for the oncoming vehicle F at least in the intersection is set on the basis of the vehicle behavior of the oncoming vehicle F, the lane information of the oncoming lane, and the road information of the intersection (a three-way junction, a four-way junction, right turn prohibited, and the like). The processing of step S9 is handled by a predicted travel region setting unit of the present disclosure. Note that the lane information of the oncoming lane and the intersection information of the intersection are acquired from the ahead-of-vehicle traveling environment information recognized by the ahead-of-vehicle traveling environment recognition unit 21d of the camera unit 21 and the road map information of the car navigation system in a case where a car navigation system is installed.

As illustrated in FIG. 3, in a case where the oncoming vehicle F is relatively far from the intersection and the course cannot be predicted, it cannot be identified whether the course inside the intersection will be straight ahead or a left or right turn. Thus, the predicted travel region is set to a wide area. In contrast, as illustrated in FIGS. 5 and 6 for example, in a case where the vehicle M has entered the intersection and the oncoming vehicle F with an unpredicted course has also entered the intersection, the distance between the vehicle M and the oncoming vehicle F is close. Thus, the vehicle behavior of the oncoming vehicle F is set to a relatively small and limited area.

Subsequently, in step S10, the driving assist control unit 11 notifies the driver via the notification device 34 that the driving assist mode will end by reporting that "the driving mode will change to the manual driving mode" or the like, and the processing proceeds to step S11.

In step S11, stopping control is executed, causing the vehicle M to decelerate and stop outside of the predicted travel region set in step S9. The stopping control includes setting the point where the travel path of the vehicle M in the intersection and the side edge of the predicted travel region intersect as the stopping target position, controlling the brake controller 32 and the acceleration/deceleration controller 33 on the basis of Equation (1) described above, and stopping the vehicle M outside (at the stopping target position) of the predicted travel region as illustrated in FIGS. 3, 5, and 6 by the dot-dash line. Note that the processing of step S11 is handled by a stopping controller of the present disclosure.

Then, in step S11, after the state of the vehicle M being stopped at the stopping target position is detected, the processing proceeds to step S12. In step S12, the vehicle M is put in standby until an ON signal from the brake switch is detected, or in other words, until the driver presses down the brake pedal. Then, in a case where the ON signal from the brake switch is detected, the processing proceeds to step S13 and the driving assist control unit 11 changes the driving mode to the manual driving mode. Then, the routine ends. As a result, the driver takes over driving of the vehicle M. Note that the processing of steps S10 and S13 is handled by a driving mode changing unit of the present disclosure.

In this manner, in the present embodiment, in a case where the vehicle M goes to turn right and an approaching oncoming vehicle is detected, first, whether the travel path of the oncoming vehicle F is predictable is checked on the basis of the vehicle behavior of the oncoming vehicle F. Then, in a case where the travel path of the oncoming vehicle F cannot be predicted, a travel region (predicted travel region) that is predictable at least in the intersection from the vehicle behavior is set. Then, after the vehicle M is automatically stopped outside of the predicted travel region, in other words, at the side edge of the predicted travel region, the driving mode is changed from the driving assist mode to the manual driving mode.

In this manner, even in a case where the travel path of the oncoming vehicle F entering the intersection cannot be predicted, contact between the vehicle M and the oncoming vehicle F can be avoided without flustering the driver, and the vehicle M can safely make a right turn. Note that the present disclosure is not limited to the embodiment described above, and, for example, in a case where oncoming vehicles F are detected, whether each one of the oncoming vehicles F will come into contact with the vehicle M is determined.

The invention claimd is:

1. A driving assist device comprising:
one or more processors; and
one or more memories including instructions, when executed, causing the one or more processors to be configured to:
acquire traveling environment information about a traveling environment ahead of a vehicle;
acquire information about an oncoming vehicle traveling in an oncoming lane;
have, as driving modes for the vehicle, a manual driving mode where a driver who drives the vehicle operates the vehicle and a driving assist mode, and, in the driving assist mode, perform driving assistance when the vehicle changes a course by crossing the oncoming lane at an intersection; and
determine whether the vehicle is set to the driving assist mode,
wherein, in response to determining that the vehicle is set to the driving assist mode, the one or more processors are further configured to:
when the vehicle enters the intersection, determine whether the oncoming vehicle, which has not yet reached the intersection, is traveling in the oncoming lane toward the intersection based on the information about the oncoming vehicle acquired;
upon determining that the oncoming vehicle, which has not yet reached the intersection, is traveling in the oncoming lane toward the intersection, determine whether a course of the oncoming vehicle is predictable based on vehicle behavior of the oncoming vehicle,
upon determining that the course of the oncoming vehicle is predictable, continue the driving assist mode based on the course of the oncoming vehicle;
upon determining that the course of the oncoming vehicle is unpredictable, set a predicted travel region of the oncoming vehicle based on the vehicle behavior, cause the vehicle to stop outside of the predicted travel region, and change the driving mode to the manual driving mode as a result of the vehicle stopping, and
wherein determining whether the course of the oncoming vehicle is predictable based on the vehicle behavior of the oncoming vehicle includes:
determining that the course of the oncoming vehicle is unpredictable in response to detecting that the oncoming vehicle, at a position within a range distanced from the intersection by a predetermined distance, is traveling a turn only lane, and has not turned on a blinker that indicates a direction corresponding to the turn only lane; and
determining that the course of the oncoming vehicle is predictable in response to detecting that the oncoming vehicle, at the position, is traveling the turn only lane, and has turned on the blinker.

2. The driving assist device according to claim 1, wherein the predicted travel region is a travel region at least in the intersection, the travel region being predictable in the intersection for the oncoming vehicle based on the vehicle behavior.

3. The driving assist device according to claim 2, wherein the vehicle behavior includes an amount of change over time in a position of the oncoming vehicle, lighting of a blinker of the oncoming vehicle, and a traffic designation of the oncoming lane where the oncoming vehicle is traveling.

4. The driving assist device according to claim 1, wherein the one or more processors are further configured not to change the driving mode to the manual driving mode until a brake pedal of the vehicle is detected to be pressed on by the driver.

5. The driving assist device according to claim 1, wherein the vehicle behavior includes an amount of change over time in a position of the oncoming vehicle, lighting of a blinker of the oncoming vehicle, and a traffic designation of the oncoming lane where the oncoming vehicle is traveling.

6. The driving assist device according to claim 1, wherein the predicted travel region has (1) a width that is greater than a width of the oncoming vehicle and (2) protrusions, and wherein the predicted travel region encompasses multiple potential behaviors of the oncoming vehicle in the intersection including directions in which the oncoming vehicle might proceed, and
wherein the one or more processors are further configured to adjust (1) the width of the predicted travel region based on the behavior of the oncoming vehicle as the oncoming vehicle proceeds within the intersection and (2) a number of the protrusions, wherein when the width of the predicted travel region and the number of the protrusions are reduced compared to a previous predicted travel region, a reduced width of, and the reduced number of the protrusions of, the predicted travel region encompass fewer potential behaviors of the oncoming vehicle than the previous predicted travel region.

7. The driving assist device according to claim 1, wherein the traveling environment information includes a traveling environment image captured using a camera of the vehicle,
the information about the oncoming vehicle includes information of the oncoming vehicle received using an inter-vehicle communication between the vehicle and the oncoming vehicle,
the determining whether the course of the oncoming vehicle is predictable is executed based on the traveling environment information and the information about the oncoming vehicle.

8. A driving assist device comprising:
circuitry configured to:
acquire traveling environment information about a traveling environment ahead of a vehicle;
acquire information about an oncoming vehicle traveling in an oncoming lane;
have, as driving modes for the vehicle, a manual driving mode where a driver who drives the vehicle operates the vehicle and a driving assist mode, and, in the driving assist mode, perform driving assistance when the vehicle changes a course by crossing the oncoming lane at an intersection; and
determine whether the vehicle is set to the driving assist mode,
wherein, in response to determining that the vehicle is set to the driving assist mode, the circuitry is further configured to:
when the vehicle enters the intersection, determine whether an oncoming vehicle, which has not yet reached the intersection, is traveling in the oncoming lane toward the intersection based on the acquired information about the oncoming vehicle;

upon determining that the oncoming vehicle, which has not yet reached the intersection, is traveling in the oncoming lane toward the intersection, determine whether a course of the oncoming vehicle is predictable based on vehicle behavior of the oncoming vehicle;

upon determining that the course of the oncoming vehicle is predictable, continue the driving assist mode based on the course of the oncoming vehicle; and upon determining that the course of the oncoming vehicle is unpredictable, set a predicted travel region of the oncoming vehicle based on the vehicle behavior, cause the vehicle to stop outside of the predicted travel region, and change the driving mode to the manual driving mode as a result of the vehicle stopping, and wherein determining whether the course of the oncoming vehicle is predictable based on the vehicle behavior of the oncoming vehicle includes:

determining that the course of the oncoming vehicle is unpredictable in response to detecting that the oncoming vehicle, at a position within a range distanced from the intersection by a predetermined distance, is traveling a turn only lane, and has not turned on a blinker that indicates a direction corresponding to the turn only lane; and determining that the course of the oncoming vehicle is predictable in response to detecting that the oncoming vehicle, at the position, is traveling the turn only lane, and has turned on the blinker.

9. The driving assist device according to claim 8, wherein the predicted travel region has (1) a width that is greater than a width of the oncoming vehicle and (2) protrusions, and wherein the predicted travel region encompasses multiple potential behaviors of the oncoming vehicle in the intersection including directions in which the oncoming vehicle might proceed, and wherein the circuitry is configured to adjust (1) the width of the predicted travel region based on the behavior of the oncoming vehicle as the oncoming vehicle proceeds within the intersection and (2) a number of the protrusions, wherein when the width of the predicted travel region and the number of the protrusions are reduced compared to a previous predicted travel region, a reduced width of, and the reduced number of the protrusions of, the predicted travel region encompass fewer potential behaviors of the oncoming vehicle than the previous predicted travel region.

10. The driving assist device according to claim 8, wherein the traveling environment information includes a traveling environment image captured using a camera of the vehicle, the information about the oncoming vehicle includes information of the oncoming vehicle received using an inter-vehicle communication between the vehicle and the oncoming vehicle, the determining whether the course of the oncoming vehicle is predictable is executed based on the traveling environment information and the information about the oncoming vehicle.

\* \* \* \* \*